United States Patent
Batal et al.

(10) Patent No.: US 9,869,257 B2
(45) Date of Patent: Jan. 16, 2018

(54) SYSTEM AND METHOD FOR PREDICTING PEAK PRESSURE VALUES USING KNOCK SENSOR

(71) Applicant: GENERAL ELECTRIC COMPANY, Schenectady, NY (US)

(72) Inventors: Iyad Batal, San Ramon, CA (US); Jeffrey Jacob Bizub, Milwaukee, WI (US); Brett Alexander Matthews, Albany, NY (US)

(73) Assignee: General Electric Company, Niskayuna, NY (US)

( * ) Notice: Subject to any disclaimer, the term of this patent is extended or adjusted under 35 U.S.C. 154(b) by 169 days.

(21) Appl. No.: 14/830,379

(22) Filed: Aug. 19, 2015

(65) Prior Publication Data
US 2017/0051699 A1    Feb. 23, 2017

(51) Int. Cl.
  *F02D 41/14* (2006.01)
  *G01M 15/11* (2006.01)
  (Continued)

(52) U.S. Cl.
  CPC ......... *F02D 35/027* (2013.01); *F02D 35/024* (2013.01); *G01M 15/11* (2013.01);
  (Continued)

(58) Field of Classification Search
  CPC ............... F02D 41/263; F02D 41/1498; F02D 41/1402; F02D 41/28; F02D 41/1497; F02D 35/027; F02D 35/024; F02D 35/023; F02D 2041/286; F02D 2041/1432; F02D 2041/1412; F02D 2041/288; F02D 2041/1411; F02D 2041/1433; F02D 2041/1425; F02D 2200/025; G01M 15/12;
  (Continued)

(56) References Cited

U.S. PATENT DOCUMENTS

| | | |
|---|---|---|
| 6,923,046 B2 | 8/2005 | von Glowczewski et al. |
| 7,128,048 B2 | 10/2006 | Yamoaka et al. |

(Continued)

FOREIGN PATENT DOCUMENTS

| | | |
|---|---|---|
| WO | 9601415 A1 | 1/1996 |
| WO | 2007019649 A1 | 2/2007 |

OTHER PUBLICATIONS

Grondin, O. et al; "Combustion parameters estimation and control using vibration signal: Application to the Diesel HCCI engine," 47th IEEE Conference on Decision and Control, Jan. 2009.

*Primary Examiner* — Lindsay Low
*Assistant Examiner* — George Jin
(74) *Attorney, Agent, or Firm* — John P. Darling

(57) ABSTRACT

A system includes at least one sensor for sensing at least one of vibration, pressure, acceleration, deflection, or movement within a reciprocating engine and a controller. The controller is configured to receive a raw signal from the at least one sensor, derive a filtered knock signal using predictive frequency bands by applying a filter, derive an absolute filtered knock signal from the filtered signal, identify a maximum of the absolute filtered knock signal for each engine cycle, predict a peak pressure value of each of one or more engine cycles using the identified maximums of the absolute filtered signal and a predictive model, and adjust operation of the reciprocating engine based on the predicted peak pressure values.

20 Claims, 11 Drawing Sheets

(51) Int. Cl.
  *F02D 35/02*   (2006.01)
  *F02D 41/28*   (2006.01)
(52) U.S. Cl.
  CPC ........... *F02D 2041/1412* (2013.01); *F02D 2041/1432* (2013.01); *F02D 2041/1433* (2013.01); *F02D 2041/288* (2013.01)
(58) Field of Classification Search
  CPC ..... G01M 15/11; G01M 15/08; G01L 23/225; G01L 23/226; G01L 23/227
  See application file for complete search history.

(56) References Cited

U.S. PATENT DOCUMENTS

| | | | |
|---|---|---|---|
| 7,299,680 B2 * | 11/2007 | Okubo | G01L 23/225 |
| | | | 123/406.42 |
| 7,334,568 B2 * | 2/2008 | Kobayashi | F02D 35/027 |
| | | | 123/406.38 |
| 7,877,195 B2 | 1/2011 | Ängeby | |
| 8,301,360 B2 * | 10/2012 | Masuda | G01L 23/225 |
| | | | 701/111 |
| 8,342,011 B2 | 1/2013 | Galtier et al. | |
| 8,396,649 B2 * | 3/2013 | Huang | F02D 35/024 |
| | | | 123/406.27 |
| 8,429,955 B2 * | 4/2013 | Taglialatela Scafati | |
| | | | G01M 15/11 |
| | | | 73/114.16 |
| 2007/0038392 A1 | 2/2007 | Iyer et al. | |
| 2016/0281617 A1 | 9/2016 | Batal et al. | |

* cited by examiner

SYSTEM AND METHOD FOR PREDICTING PEAK PRESSURE VALUES USING KNOCK SENSOR

BACKGROUND

The subject matter disclosed herein relates to combustion engines, and more specifically to estimating peak pressure values in a combustion engine.

Combustion engines typically combust a carbonaceous fuel, such as natural gas, gasoline, diesel, and the like, and use the corresponding expansion of high temperature and pressure gases to apply a force to certain components of the engine (e.g., piston disposed in a cylinder) to move the components over a distance. Each cylinder may include one or more valves that open and close in conjunction with combustion of the carbonaceous fuel. For example, an intake valve may direct an oxidant such as air into the cylinder. A fuel mixes with the oxidant and combusts (e.g., ignition via a spark) to generate combustion fluids (e.g., hot gases), which then exit the cylinder via an exhaust valve.

The peak firing pressure (PFP) over multiple engine cycles, otherwise referred to as the peak pressure values (PPVs) of an engine may affect how an engine control unit (ECU) controls an engine. Typically, the PFP is measured by an in-cylinder pressure sensor. These pressure sensors can be expensive and fragile when exposed to the harsh conditions inside a cylinder. Accordingly, it would be beneficial to be able to estimate or determine the peak pressure values of a combustion engine without the use of in-cylinder sensors.

BRIEF DESCRIPTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, a system includes at least one sensor for sensing at least one of vibration, pressure, acceleration, deflection, or movement within a reciprocating engine and a controller. The controller is configured to receive a raw signal from the at least one sensor, derive a filtered knock signal using predictive frequency bands by applying a filter, derive an absolute filtered knock signal from the filtered signal, identify a maximum of the absolute filtered knock signal for each engine cycle, predict a peak pressure value of each of one or more engine cycles using the identified maximums of the absolute filtered signal and a predictive model, and adjust operation of the reciprocating engine based on the predicted peak pressure values.

In a second embodiment, a method for training a controller to estimate a peak firing pressure of a cylinder in a reciprocating engine includes receiving a raw signal from at least one exterior sensor, wherein the raw signal comprises data corresponding to a peak firing pressure event, receiving a true pressure signal from a pressure sensor corresponding to the true peak firing pressure, deriving a filtered signal by applying a low pass or a band pass filter to the raw signal, deriving an absolute filtered signal from the filtered signal, identifying a maximum of the absolute filtered signal for each engine cycle, identifying the true peak pressure value for each engine cycle from the true pressure signal, mapping the maximums of the absolute filtered signal to the true peak pressure values, deriving predictive frequency bands for the peak firing pressure, and executing an algorithm to generate a predictive model using the maximums of the absolute filtered signal and the true pressure signal, wherein the predictive model is configured to estimate the peak firing pressure of the cylinder in the reciprocating engine during ordinary engine operation.

In a third embodiment, a system includes a reciprocating engine controller configured to receive a raw signal from at least one sensor coupled to a reciprocating engine, derive a filtered signal using predictive frequency bands by applying a low pass or band pass filter, derive an absolute filtered signal from the filtered signal, identify a maximum of the absolute filtered signal (MAFS) of each engine cycle, predict a peak firing pressure of each engine cycle using the identified MAFS and a predictive model, and output a control action for at least the reciprocating engine based on the predicted peak firing pressure.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
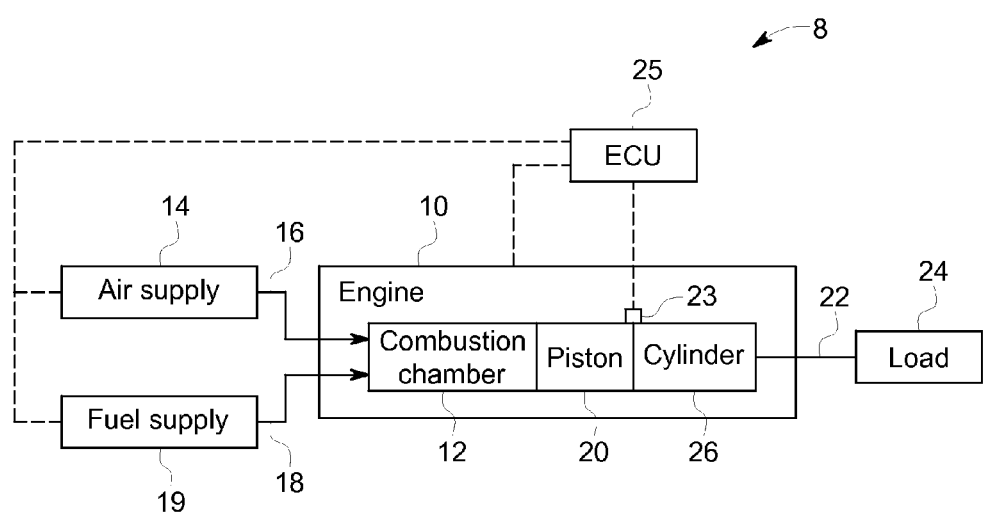
FIG. 1 is a block diagram of an embodiment of an engine driven power generation system having a reciprocating internal combustion engine in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The presently disclosed systems and methods relate to estimating peak pressure values (PPVs) in a reciprocating, internal combustion engine using one or more sensors, such as a knock sensor, which may be disposed outside of the cylinder or coupled to the exterior of the cylinder. A knock sensor may include an acoustic or sound sensor, a vibration sensor, or any combination thereof. For example, the knock sensor may be a piezoelectric accelerometer, a microelectromechanical system (MEMS) sensor, a Hall Effect sensor, a magnetostrictive sensor, and/or any other sensor designed to sense vibration, acceleration, acoustics, sound, and/or movement. The knock sensor may monitor acoustics and/or vibrations associated with combustion in the engine to detect a knock condition (e.g., combustion at an unexpected time not during a normal window of time for combustion), or other engine events that may create acoustic and/or vibration signals. In other embodiments, the sensor may not be a knock sensor, but any sensor that may sense vibration, pressure, acceleration, deflection, or movement. For the sake of simplicity, the sensor will hereafter be referred to as a knock sensor, and the signal generated by the sensor will hereafter be referred to as a knock signal, even though it should be understood that the sensor may not be a knock sensor.

In certain instances, it may be desirable to determine the PPVs so that a controller may adjust various parameters based on the operating condition information to optimize engine performance. However, sensors (e.g., pressure sensors) positioned within an engine cylinder may be significantly more expensive than knock sensors and may be more susceptible to damage upon exposure to the harsh conditions inside a cylinder. Therefore, it may be advantageous to train (e.g., via machine learning) a controller to convert or transform a signal from a knock sensor into a form that may enable an accurate estimation of the PPVs. Such a system may estimate the pressure values in the cylinder with accuracy comparable to that of an in-cylinder sensor (e.g., pressure sensor), while having the benefit of being less expensive and more robust.

Because of the percussive nature of combustion engines, knock sensors may be capable of detecting signatures even when mounted on the exterior of an engine cylinder. However, the knock sensors may also be disposed at various locations in or about one or more cylinders. Knock sensors detect vibrations of the cylinder, and a controller may convert a vibrational profile of the cylinder, provided by a knock sensor, into useful parameters for estimating the PPVs. It is now recognized that knock sensors detect vibrations in, or proximate to, the cylinder, and may communicate a signal indicative of the vibrational profile to a controller, which may convert the signal and make various computations to produce the estimated pressure values. The present disclosure is related to systems and methods for determining the peak pressure values of an engine by training a controller or other computing device to estimate the PPVs based on a knock sensor signal.

Turning to the drawings, FIG. 1 illustrates a block diagram of an embodiment of a portion of an engine driven power generation system 8 having a reciprocating internal combustion engine, which may experience a PFP that may be estimated using the presently disclosed system and methods. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An oxidant supply 14 (e.g., an air supply) is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26, which converts pressure exerted by the gases into a rotating motion, thereby causing a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example. The fuel 18 may also include a variety of liquid fuels, such as gasoline or diesel fuel.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders 26 (e.g., 1-24). For example, in certain embodiments, the system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders 26 and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL, CFR-RON), for example.

The driven power generation system 8 may include one or more knock sensors 23 suitable for detecting engine "knock." The knock sensor 23 may sense vibrations, acoustics, or sound caused by combustion in the engine 10, such as vibrations, acoustics, or sound due to detonation, pre-ignition, and/or pinging. The knock sensor 23 may also sense vibrations, acoustics, or sound caused by intake or exhaust valve closures. Therefore, the knock sensor 23 may include an acoustic or sound sensor, a vibration sensor, or a combination thereof. For example, the knock sensor 23 may include a piezoelectric vibration sensor. The knock sensor 23 is shown communicatively coupled to a system 25 (e.g., a control system, a monitoring system, a controller, or an engine control unit "ECU"). During operations, signals from the knock sensor 23 are communicated to the system 25 to determine if knocking conditions (e.g., pinging) exist. The system 25 may adjust operating parameters of the engine 10 to enhance engine performance. For example, the system 25 may adjust an engine timing map of the engine 10, a compression ratio, an oxidant/fuel ratio of the engine 10, a flow of exhaust recirculation gas of the engine 10, a position of an intake or exhaust valve, or another operating parameter of the engine 10.

Figure 2:
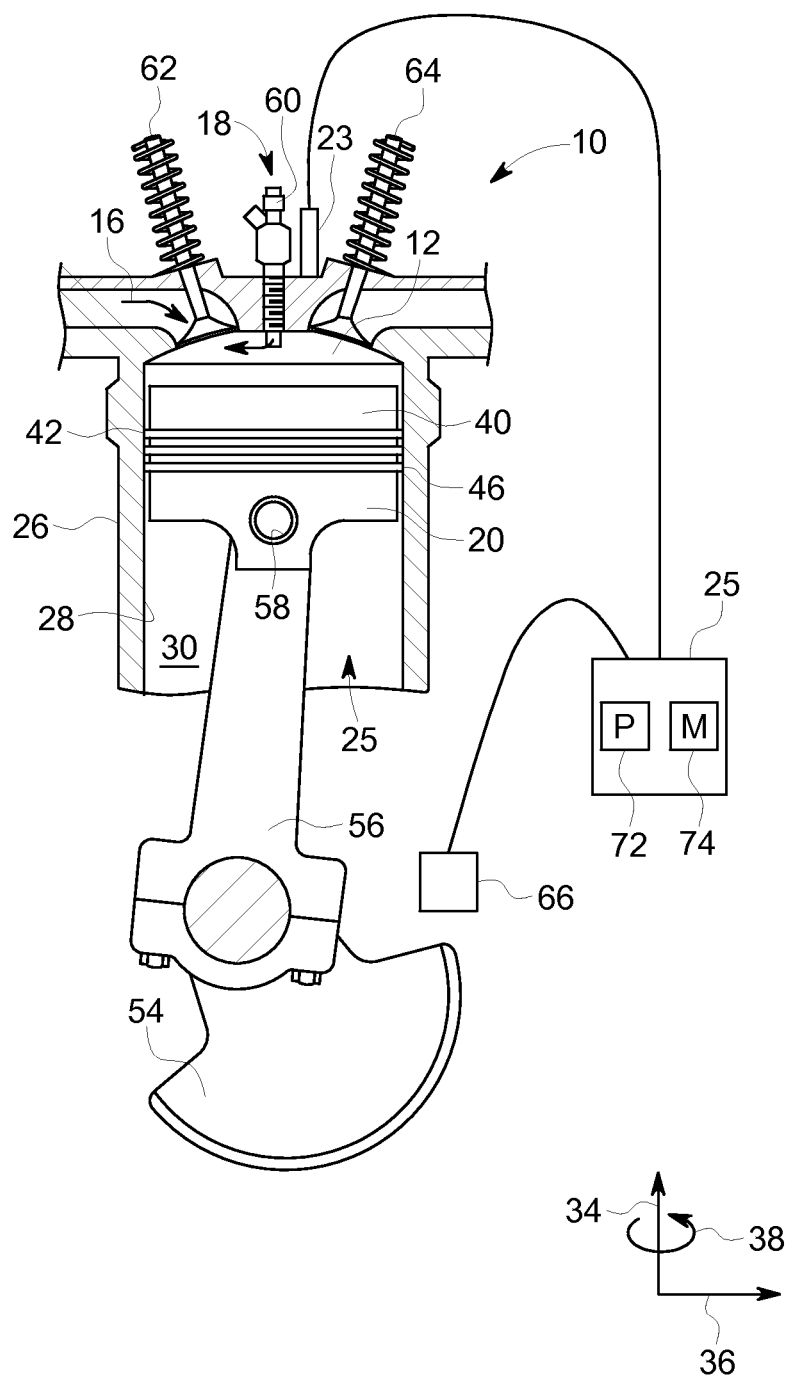
FIG. 2 is a cross-sectional side view of an embodiment of a piston-cylinder assembly having a piston disposed within a cylinder of the reciprocating engine in accordance with aspects of the present disclosure.

FIG. 2 is a cross-sectional side view of an embodiment of a piston-cylinder assembly having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 20 into a rotating motion. As the piston 20 moves, the crankshaft 54 rotates to power the load 24 (shown in FIG. 1), as discussed above. As shown, the combustion chamber 12 is positioned adjacent to the top portion 40 of the piston 24. A fuel injector 60 provides the fuel 18 to the combustion chamber 12, and an intake valve 62 controls the delivery of oxidant (e.g., air 16) to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the oxidant 16 in the combustion chamber 12 may cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from TDC to BDC or from BDC to TDC, the crankshaft 54 rotates one half of a revolution. Each movement of the piston 20 from TDC to BDC or from BDC to TDC is called a stroke, and engine 10 embodiments may include two-stroke engines, three-stroke engines, four-stroke engines, five-stroke engines, six-stroke engines, or more.

During engine 10 operations, a sequence including an intake process, a compression process, a power process, and an exhaust process typically occurs. The intake process enables a combustible mixture, such as fuel 18 and oxidant 16 (e.g., air), to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then urges the piston 20 to BDC. The exhaust process typically returns the piston 20 to TDC, while keeping the exhaust valve 64 open. The exhaust process thus expels the spent fuel-air mixture through the exhaust valve 64. It is to be noted that more than one intake valve 62 and exhaust valve 64 may be used per cylinder 26.

The depicted engine 10 may include a crankshaft sensor 66, knock sensor 23, and the system 25, which includes a processor 72 and memory unit 74. The crankshaft sensor 66 senses the position and/or rotational speed of the crankshaft 54. Accordingly, a crank angle or crank timing information may be derived. That is, when monitoring combustion engines, timing is frequently expressed in terms of crankshaft angle. For example, a full cycle of a four stroke engine 10 may be measured as a 720° cycle. The knock sensor 23 may be a piezoelectric accelerometer, a microelectromechanical system (MEMS) sensor, a Hall Effect sensor, a magnetostrictive sensor, and/or any other sensor designed to sense vibration, acceleration, acoustics, sound, and/or movement. In other embodiments, the sensor 23 may not be a knock sensor, but any sensor that may sense vibration, pressure, acceleration, deflection, or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder may include one or more knock sensors 23. The crankshaft sensor 66 and the knock sensor 23 are shown in electronic communication with the system 25 (e.g., a control system, a monitoring system, a controller, or an engine control unit "ECU"). The system 25 may include non-transitory code or instructions stored in a machine-readable medium (e.g., the memory unit 74) and used by a processor (e.g., the processor 72) to implement the techniques disclosed herein. The memory may store computer instructions that may be executed by the processor 72. Additionally, the memory may store look-up tables and/or other relevant data. The system 25 monitors and controls the operation of the engine 10, for example, by adjusting ignition timing, timing of opening/closing valves 62 and 64, adjusting the delivery of fuel and oxidant (e.g., air), and so on.

In certain embodiments, other sensors may also be included in the system 8 and coupled to the system 25. For example, the sensors may include atmospheric and engine sensors, such as pressure sensors, temperature sensors, speed sensors, and so forth. For example, the sensors may include knock sensors, crankshaft sensors, oxygen or lambda sensors, engine air intake temperature sensors, engine air intake pressure sensors, jacket water temperature sensors, engine exhaust temperature sensors, engine exhaust pressure sensors, and exhaust gas composition sensors. Other sensors may also include compressor inlet and outlet sensors for temperature and pressure.

During the power process of engine operation, a force (e.g., a pressure force) is exerted on the piston 20 by the expanding combustion gases. The maximum force exerted on the piston 20 is described as the peak firing pressure (PFP). The PFPs over a series of cycles may be referred to as the Peak Pressure Values (PPVs). If the PFP is not at an optimal level, various engine parameters (e.g., ignition timing, fuel/air ratio, intake or exhaust valve closure timing, etc.) may be adjusted to enhance engine performance.

The present disclosure relates to predicting one or more PPVs using a signal from the knock sensor 23. In certain embodiments, the system 25 is trained (e.g., via machine learning) to associate features of a knock sensor signal to a pressure in the cylinder 26.

Figure 3:
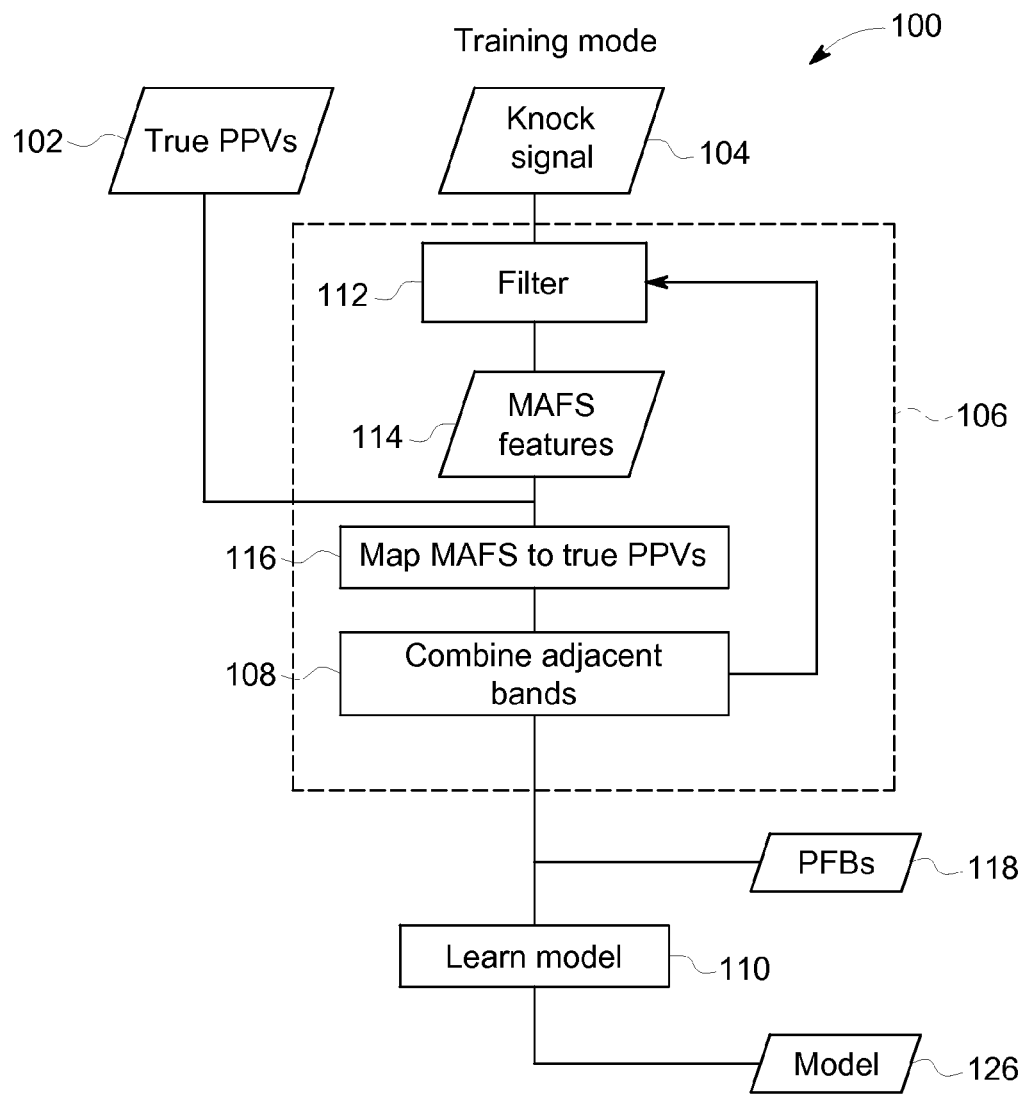
FIG. 3 is a flow chart of a process for training a control system in accordance with aspects of the present disclosure.

FIG. 3 illustrates a flow chart 100 of a process for training the system 25 (e.g., a control system, a monitoring system, a controller, or an engine control unit "ECU") by developing a predictive model and predictive frequency bands ("PFBs") to estimate PPVs in the cylinder 26. The true PPVs 102 of the cylinder 26 are received or input into the system 25. The true PPVs 102 may be determined by a pressure sensor disposed within the cylinder 26 during a series of test cycles. Additionally, the system 25 receives a knock sensor signal 104. The knock sensor signal 104 is also indicative of the engine PPVs in that it may include engine vibrations sensed by the knock sensor 23, which may correlate with the peak pressures of each engine cycle. However, the knock sensor signal 104 may not be used to directly estimate the PPVs at this time. The training process 100 may be broken up into two subprocesses: mining predictive frequency band (block 106) and learning the model (block 110).

To evaluate the predictiveness of a frequency band, the knock sensor signal 104 may be filtered in block 112 using a low pass or band pass filter. The limits of the low pass or band pass filter correspond to the upper and lower limits of the frequency band such that the low pass or band pass filter isolates the frequency components of the signal corresponding to the band of interest. The maximum of the absolute filtered signal (MAFS) is computed and MAFS features 114 for each cycle are identified. The filter and computation of the MAFS 114 will be discussed in more detail with regard to FIGS. 5-7. In block 116, the process 100 maps the MAFS features 114 to the true PPVs 102. This will be discussed in more detail with regard to FIG. 8. The correlation between the MAFS features 114 and the true PPVs 102 will be used to determine the predictiveness of the frequency band.

The system 25 may mine for predictive frequency bands ("PFBs") 118 by searching for the most predictive frequency bands (i.e., the frequency bands with MAFS features that are highly correlative of the true PPVs 102). PFBs 118 are frequency ranges of the knock sensor signal 104 that are indicative of the PPVs.

In block 108, the process 100 attempts to create larger and larger frequency bands by combining adjacent frequency bands in a bottom-up fashion until no adjacent frequencies can be combined to improve the predictiveness (i.e., the correlation between the MAFS features 114 and the true PPVs 102) of the frequency band. At this point, the system may use the discrete frequency or frequency range as the PFB 112, or return to block 112 and filter the raw knock signal 104 with revised frequency ranges. The PFB 118 may be indicative of frequency ranges of a knock sensor signal that correspond to the PPVs. The process outputs the PFBs 118. The system may undergo model learning (block 110), such that the system 25 may associate certain MAFS features with the PPVs, and thus predict PPVs given MAFS features computed from a knock signal. For example, the system 25 may use a Gaussian Process (GP) ensemble, linear models, kernel regression, random forest, or another machine learning algorithm configured to generate a predictive model 126 using the MAFS features and the true PPVs. The machine learning algorithm may repeat some or all of the blocks in process 100 until the predictive model estimates the peak firing pressure within 75%, 80%, 85%, 90%, 92%, 95%, 96%, 97%, 98%, 99%, or some other value of the true peak firing pressure. The predictive model 126 is then output. The system 25 may store the predictive model 126 and PFBs 118 and then utilize the predictive model 126 and the PFBs 118 to estimate the PPVs.

Figure 4:
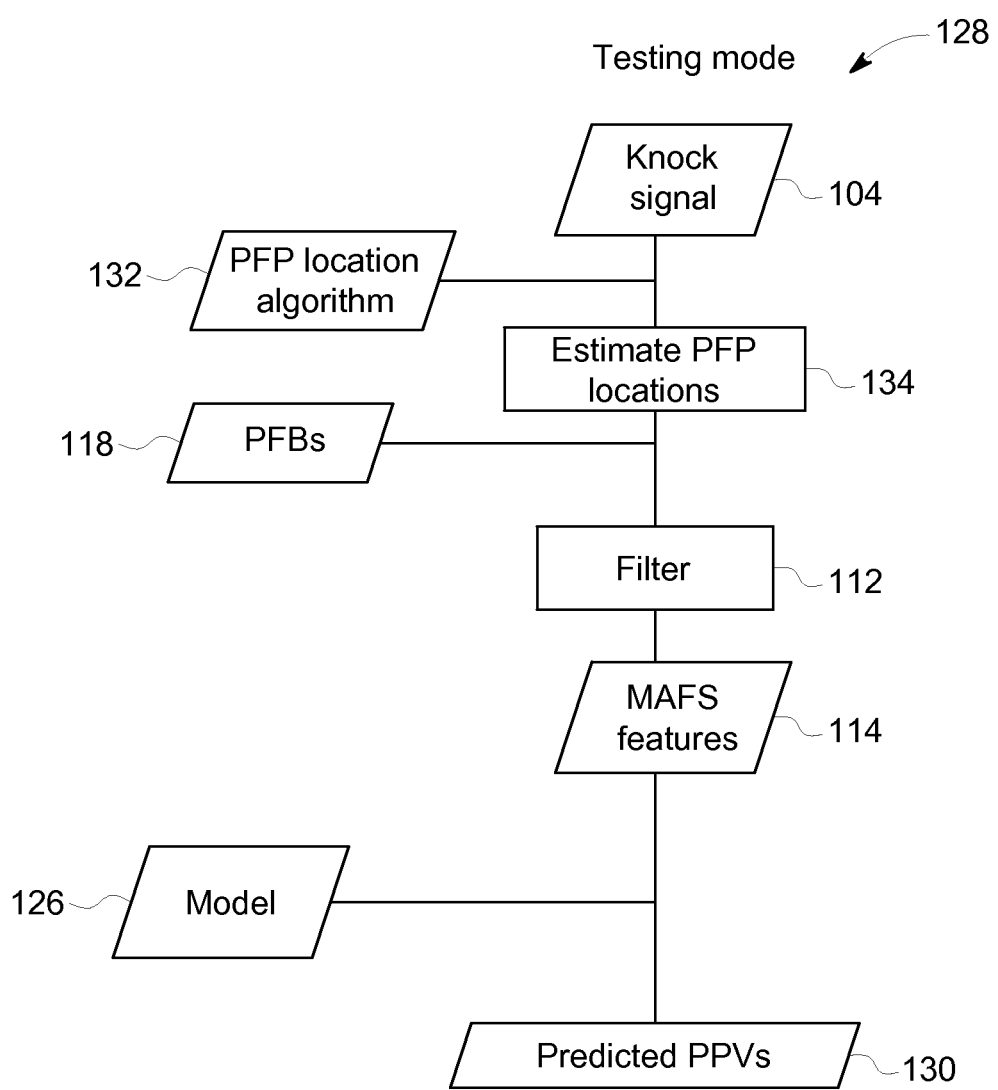
FIG. 4 is flow chart of a process for utilizing or testing the predictive model to determine the peak pressure values (PPVs) in a cylinder in accordance with aspects of the present disclosure.

FIG. 4 illustrates a flow chart of a process 128 for utilizing or testing the predictive model 126 to determine the PPVs. Similar to flow chart 100, the system 25 (e.g., a control system, a monitoring system, a controller, or an engine control unit "ECU") may receive the PFBs 118 and the predictive model 126 derived in process 100, a PFP location algorithm, as well as a raw knock sensor signal 104. Disclosure and a detailed description of the PFP location algorithm and how it is derived is set forth in U.S. patent application Ser. No. 14/667,275 entitled "SYSTEM AND METHOD FOR LOCATING AN ENGINE EVENT," filed on Mar. 24, 2015, which is hereby incorporated into the present disclosure by reference in its entirety. In block 134, the process 128 applies the PFP location algorithm to estimate the location (e.g., time, crank angle, etc.) of the PFPs.

In block 112, the process 128 filters the knock sensor signal 104 in block 112 using a low pass or band pass filter. The low pass or band pass filter isolates the frequency components of the signal corresponding to the PFB 118. The ranges of the low pass or band pass filter correspond to the ranges of the PFBs 118 input to the process 128. The process computes the maximum of the absolute filtered signal (MAFS) features for each PFB in block 114. The process 128 applies the predictive model 126 to the computed MAFS features 114 to determine the predicted PPVs 130. The system 25 may use the most probable PPVs 130 to control engine operating parameters and enhance engine performance. For example, the system 25 may adjust an engine timing map (e.g., ignition timing) of the engine 10, an oxidant/fuel ratio, a flow of exhaust recirculation gas, a position of the intake 62 or the exhaust valve 64, or another operating parameter of the engine 10.

In certain embodiments, the system 25 will undergo the process in flow chart 128 (e.g., testing mode) immediately after the process in flow chart 100 (e.g., training mode). Depending on the difference between the predicted PPVs and the true PPVs, the system 25 may repeat the process in flow chart 100 until the difference between the estimated PPVs and the true PPVs is at a desirable level (e.g., within 75%, 80%, 85%, 90%, 92%, 95%, 96%, 97%, 98%, 99%, or some other value of the true peak firing pressure). In other words, the system 25 may continue to run the process in flow chart 100 to refine the predictive model 126 and PFBs 118 until the peak pressures of the engine event can be estimated within a desired degree of accuracy.

Additionally, the predictive model 126 generated by process 100 may be specific to a particular engine type. For example, the predictive model 126 used to estimate the PPVs of the engine event in a Jenbacher Type 2 Engine may not accurately estimate the PPVs in a Jenbacher Type 3 Engine. Thus, the process of flow chart 100 may be performed for each engine type in which the engine PPVs will be estimated. As non-limiting examples, the process of flow chart 100 may be performed on General Electric Company's Jenbacher Engines (e.g., Jenbacher Type 2, Type 3, Type 4, Type 6 or J920 FleXtra), Waukesha Engines (e.g., Waukesha VGF, VHP, APG, 275GL, CRF-RON) or any other reciprocating internal combustion engines.

Figure 5:
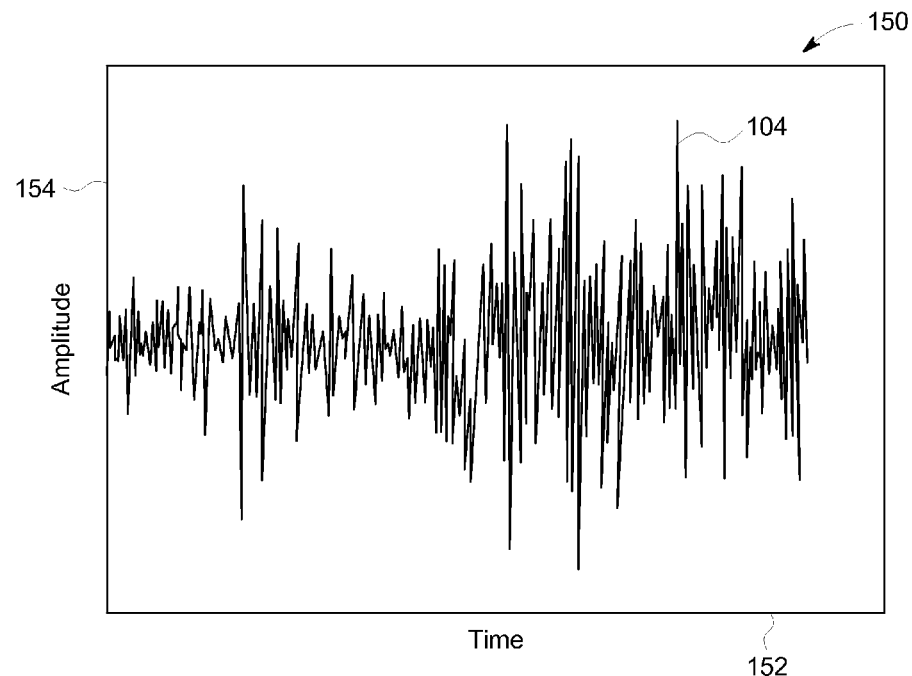
FIG. 5 is a sample plot of a raw knock sensor signal around the peak firing pressure (PFP) of a cycle in accordance with aspects of the present disclosure.

FIG. 5 is a sample plot 150 of a raw knock sensor signal 104 around the peak firing pressure (PFP) of a cycle. The x-axis 152 represents time. However, time is often expressed as crank 54 angle degrees when analyzing engine data. Accordingly, in some embodiments, data indicative of the crank angle may be collected from a crankshaft sensor 66, and then synchronized with the knock signal 104 such that the knock signal 104 is plotted against crank angle degrees. The y-axis 154 represents the amplitude of the knock signal 104. The amplitude may be expressed in volts, current, meters per second squared, decibels, etc. Though the knock signal 104 shown in FIG. 5 is an example of a knock signal 104 sent to the system 25, it should be understood that actual knock signals 104 may look similar or very different.

Figure 6:
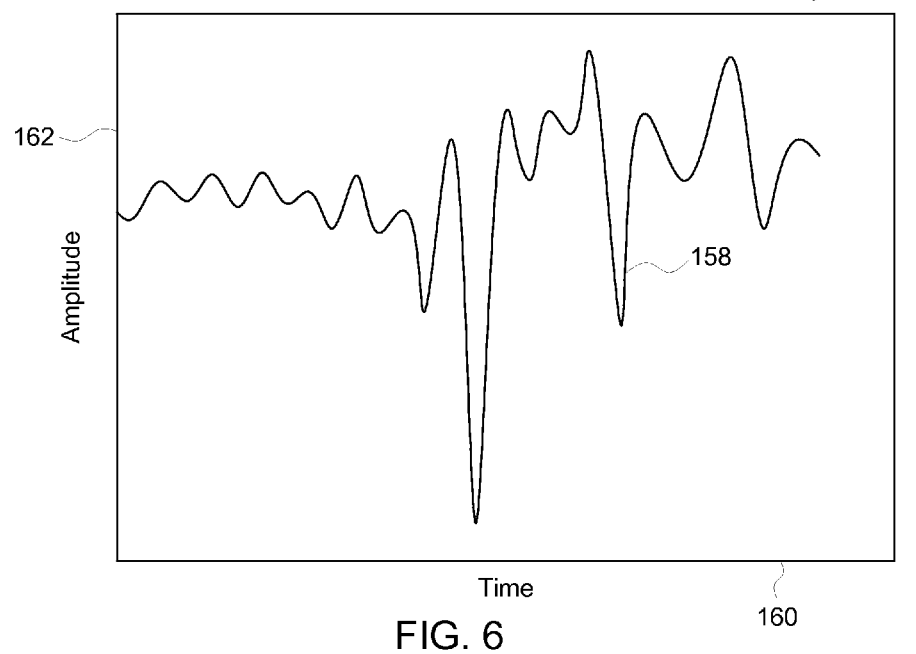
FIG. 6 is sample plot of a filtered knock signal after a low pass filter has been applied to the raw knock signal in accordance with aspects of the present disclosure.

FIG. 6 is a sample plot 156 of a filtered knock signal 158 after a low pass filter having a range of 0-1400 Hz was applied to a raw knock signal. As with the plot 150 in FIG. 5, the x-axis 160 represents time or crank angle and the y-axis 162 represents the amplitude of the signal 158. As previously discussed with regard to FIGS. 3 and 4, the raw knock signal 104 is filtered using a low pass filter or a band pass filter. For example, the upper limit of the low pass filter range may be 500, 600, 700, 800, 900, 1000, 1100, 1200, 1300, 1400, 1500, 1600 Hz, or higher, and anywhere in between. Alternatively, the lower limit of the range of the band pass filter range may be 500, 600, 700, 800, 900, 1000, 1100, 1200, 1300, 1400, 1500, 1600, 1700, 1800, 1900, 2000 Hz, or higher, lower, or anywhere in between. The upper limit of band pass filter range may be 1000, 1100, 1200, 1300, 1400, 1500, 1600, 1700, 1800, 1900, 2000, 2100, 2200, 2300, 2400, 2500 Hz, or higher, lower, or anywhere in between. The specific ranges of the low pass or band pass filters may be determined from the true PPV data 102, or from the PFBs 118. It should be understood, however, that filter ranges may differ from engine to engine and from application to application. Thus, use of the disclosed techniques may involve use of filters with ranges outside of those listed. Though the filtered knock signal 158 shown in FIG. 6 is an example of a raw knock signal 104 sent to the system 25 and filtered, it should be understood that actual filtered knock signals 158 may look similar or very different.

Figure 7:
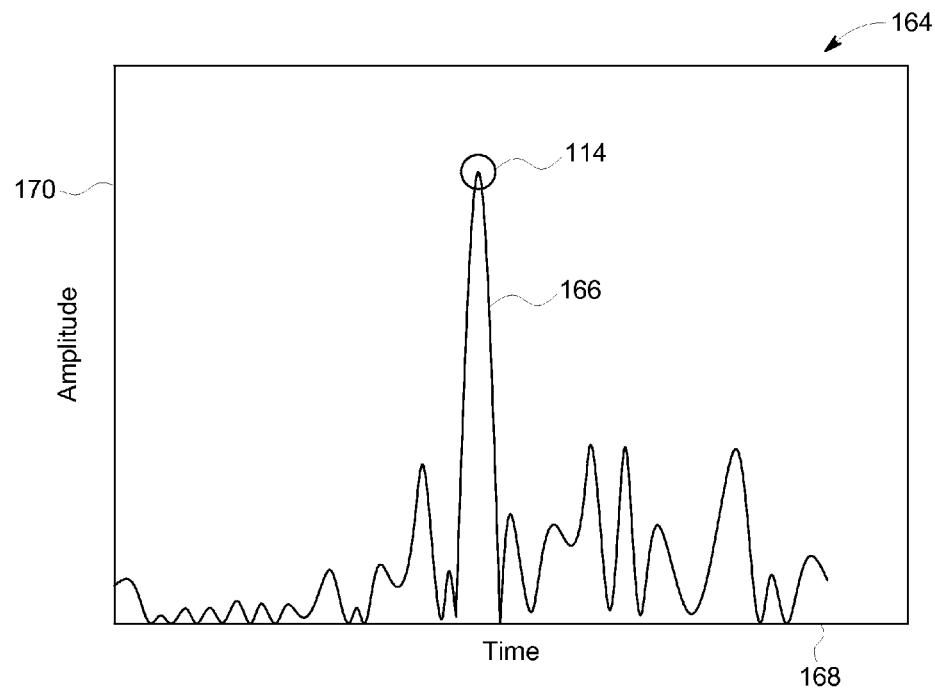
FIG. 7 is a sample plot of the absolute filtered signal in accordance with aspects of the present disclosure.

FIG. 7 is a sample plot 164 of the absolute filtered signal 166. As with plots 150 and 156, the x-axis 168 represents time or crank angle and the y-axis 170 represents the amplitude of the signal 166. As previously discussed with regard to FIGS. 3 and 4, once the raw knock signal 104 is filtered, the absolute filtered signal 166 is generated by taking the absolute value of each data point, such that the entire signal 166 is positive. The system 25 then identifies the maximum of the absolute filtered signal (MAFS) 114 for each engine 10 cycle.

Figure 8:
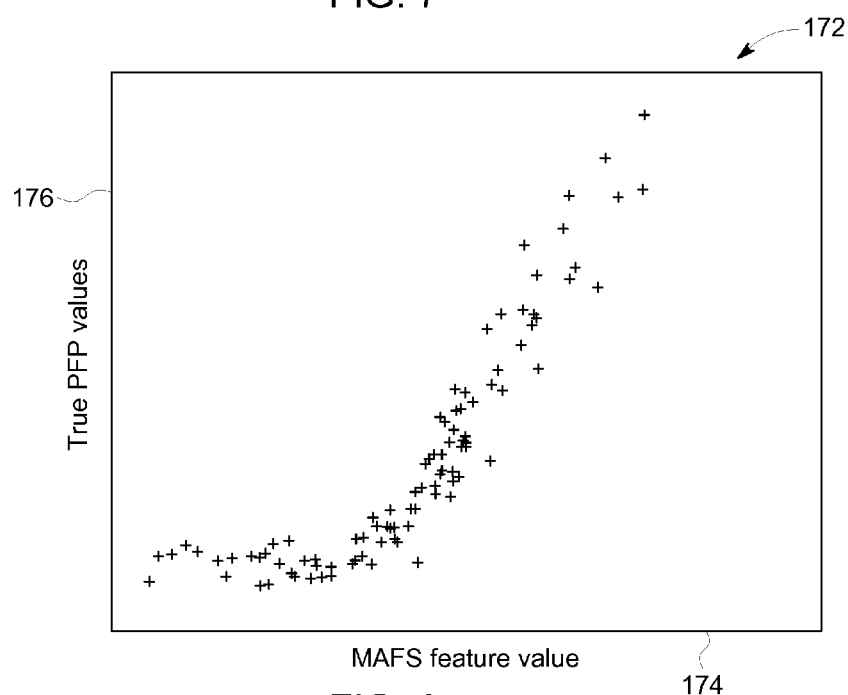
FIG. 8 is a plot of the maximum of the absolute filtered signal (MAFS) features for each cycle plotted against the true PPVs in accordance with aspects of the present disclosure.

FIG. 8 shows a plot 172 of the MAFS features 114 for each cycle plotted against the true pressure values. The x-axis 174 represents the MAFS 114 for each engine cycle, as shown in plot 164. The y-axis 176 represents the true peak pressure for each engine cycle, as taken from the true PPVs 102 input to the system 25. As discussed with regard to FIG. 3, during training mode 100, the system 25 maps the MAFS feature 114 for each engine cycle against the true peak pressure measures by the pressure sensor in the cylinder 26. The system used the correlation between the true PPVs 102 and MAFS features 114 to learn and create the PFBs 118 and generate the model 126.

Figure 9:
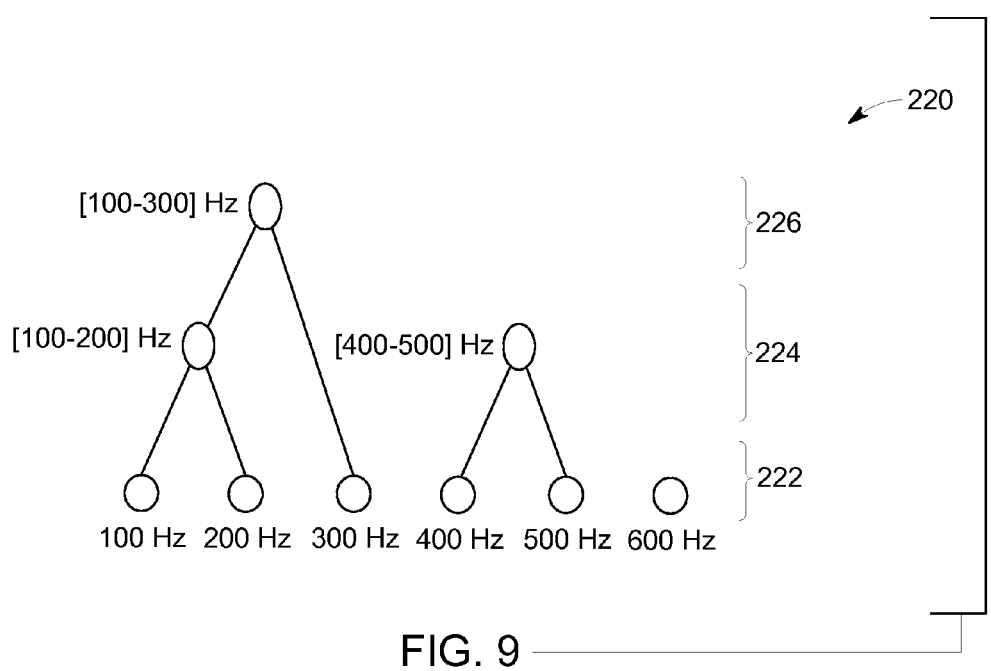
FIG. 9 is a diagram illustrating how the control system constructs predictive frequency bands (PFBs) in accordance with aspects of the present disclosure.

FIG. 9 is a diagram 220 illustrating how the system 25 (e.g., a control system, a monitoring system, a controller, or an engine control unit "ECU") constructs PFBs 118 by combining adjacent frequency bands to improve the predictiveness (i.e., the correlation between MAFS features 114 and the true PPVs 102) of a given band. In certain embodiments, the diagram 220 includes three tiers (e.g., levels); however, other embodiments may have less than three levels (e.g., 1 or 2), while other embodiments may have more than three levels (e.g., 4, 5, 6 or more). In the diagram 220, the first tier 222 includes all of the discrete frequencies in the spectrum (e.g., all of the frequencies in the knock sensor signal 104). The second tier 224 is a combination of two discrete frequencies from the first tier 222. For example, a 100 Hz and a 200 Hz discrete frequency are merged into a 100-200 Hz frequency band. As discussed previously, the discrete frequencies of a tier may be merged when combining two adjacent bands improves the predictiveness of the PFB 118. Accordingly, in certain embodiments, the predictiveness of the 100-200 Hz frequency band is greater than the predictiveness of the individual 100 Hz and 200 Hz discrete frequencies.

Similarly, a 400 Hz and a 500 Hz discrete frequency may be merged into a 400-500 Hz frequency band, as illustrated in the diagram 220. Again, this may occur because the predictiveness of the 400-500 Hz frequency band is greater than the predictiveness of the individual 400 Hz and 500 Hz discrete frequencies. If no combination of discrete frequencies occurs, then the predictiveness of the individual, discrete frequency may have been larger than the predictiveness of the combined frequency band. For example, a 600 Hz discrete frequency was not combined with any other discrete frequency or frequency band. Therefore, the 600 Hz discrete frequency may have been more predictive than the 500-600 Hz frequency band or the 400-600 Hz frequency band.

The diagram 220 also has a third tier 226. The third tier 226 represents a frequency range that is larger (e.g., broader) than the frequency range of the second tier 224 (e.g., the third tier has a frequency range of 200 Hz whereas the second tier has a frequency range of 100 Hz). As shown in the diagram 220, a 300 Hz discrete frequency was combined with the second tier frequency band of 100-200 Hz to create a third tier frequency range of 100-300 Hz. Therefore, the predictiveness of the frequency band of 100-300 Hz may be greater than that of the frequency band of 100-200 Hz as well as the predictiveness for each of the individual, discrete frequencies (e.g., 100 Hz, 200 Hz, and 300 Hz).

Once the predictiveness of a frequency band can no longer be increased by combining it with adjacent, discrete frequencies, a PFB 118 has been determined. For example, if the predictiveness of a 100-400 Hz frequency band is less than the predictiveness for the 100-300 Hz frequency band, then the 400 Hz discrete frequency is not combined into the band, and the 100-300 Hz is the frequency range for the PFB 118.

Figure 10:
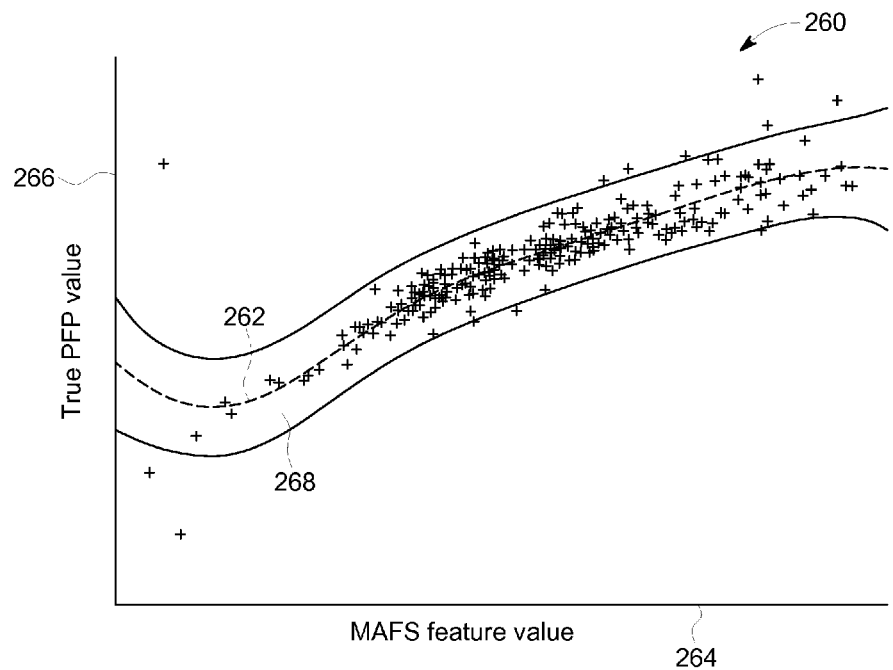
FIG. 10 is a sample plot of a Gaussian Process (GP) model using a low pass filter with a range of 0-600 Hz in accordance with aspects of the present disclosure.

FIGS. 10-13 show the plots of sample Gaussian Process (GP) models 126 for four different frequency bands using MAFS features 114 of various PFBs 118 and true PPV CFR-RON engine data 102. FIG. 10 shows a sample plot 260 of a GP model 262 using a low pass filter with a range of 0-600 Hz. The x-axis 264 represents the MAFS 114 for each engine cycle, as shown in plot 164. The y-axis 266 represents the true peak pressure for each engine cycle, as taken from the true PPVs 102 input to the system 25. Line 262 is the model created using a Gaussian Process (GP) ensemble. However, other regression models (e.g., linear models, kernel regression, random forest, etc.) may be used. The shaded region 268 represents the 95% confidence interval of the model.

Figure 11:
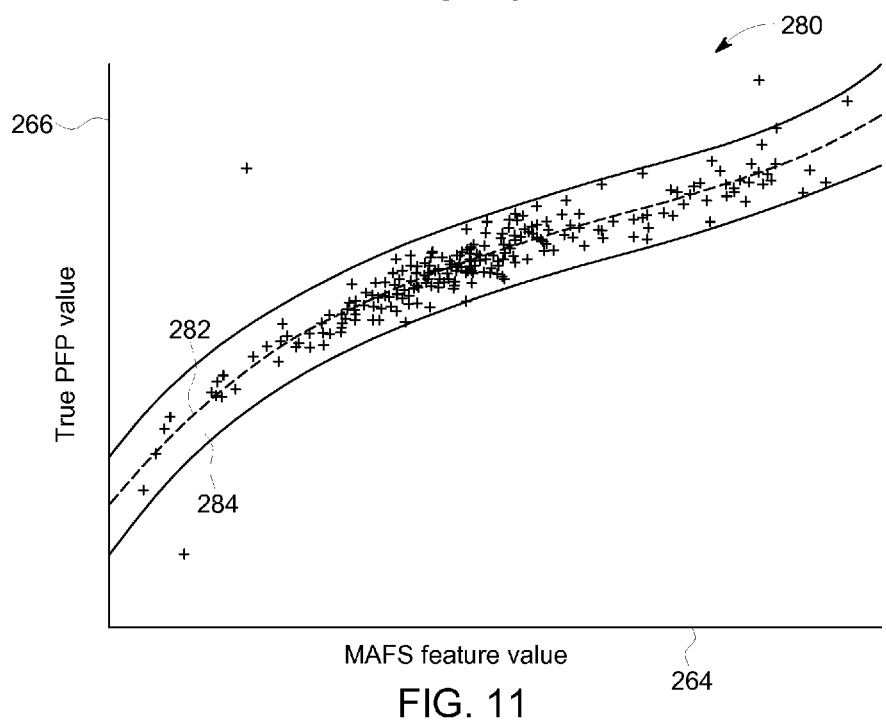
FIG. 11 is a sample plot of a GP model using a band pass filter with a range of 600-1200 Hz in accordance with aspects of the present disclosure.

FIG. 11 shows a sample plot 280 of a GP model 282 using a band pass filter with a range of 600-1200 Hz. The x-axis 264 represents the MAFS 114 for each engine cycle, as shown in plot 164. The y-axis 266 represents the true peak pressure for each engine cycle, as taken from the true PPVs 102 input to the system 25. Line 282 is the model created using a Gaussian Process (GP) ensemble. However, other regression models (e.g., linear models, kernel regression, random forest, etc.) may be used. The shaded region 284 represents the 95% confidence interval of the model 282.

Figure 12:
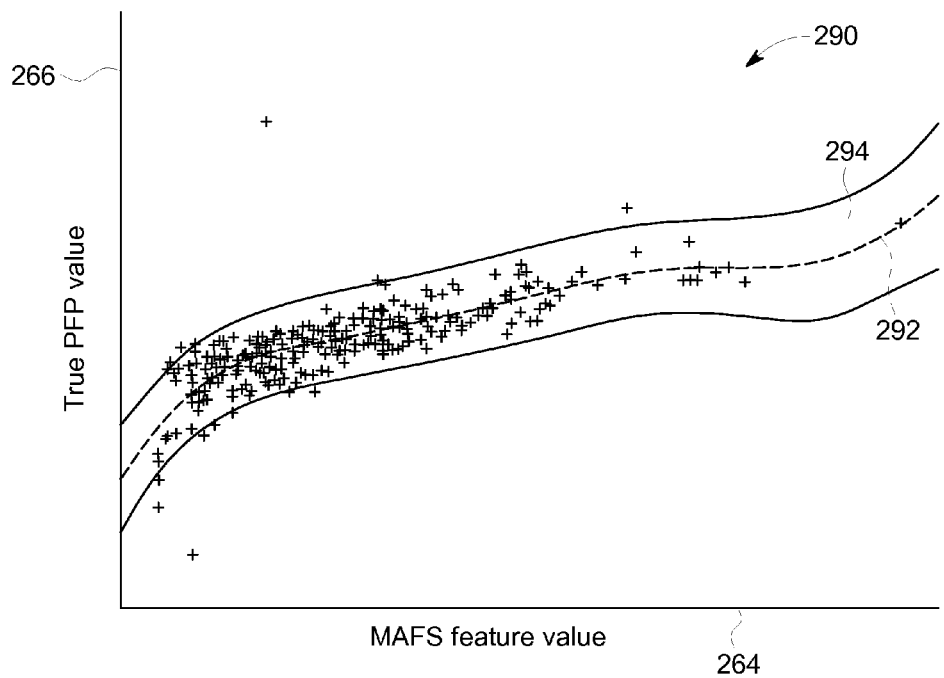
FIG. 12 is a sample plot of a GP model using a band pass filter with a range of 1.2-2.0 kHz in accordance with aspects of the present disclosure.

FIG. 12 shows a sample plot 290 of a GP model 292 using a band pass filter with a range of 1.2-2.0 kHz. The x-axis 264 represents the MAFS 114 for each engine cycle, as shown in plot 164. The y-axis 266 represents the true peak pressure for each engine cycle, as taken from the true PPVs 102 input to the system 25. Line 292 is the model created using a Gaussian Process (GP) ensemble, however, other regression models (e.g., linear models, kernel regression, random forest, etc. may be used). The shaded region 294 represents the 95% confidence interval of the model 282.

Figure 13:
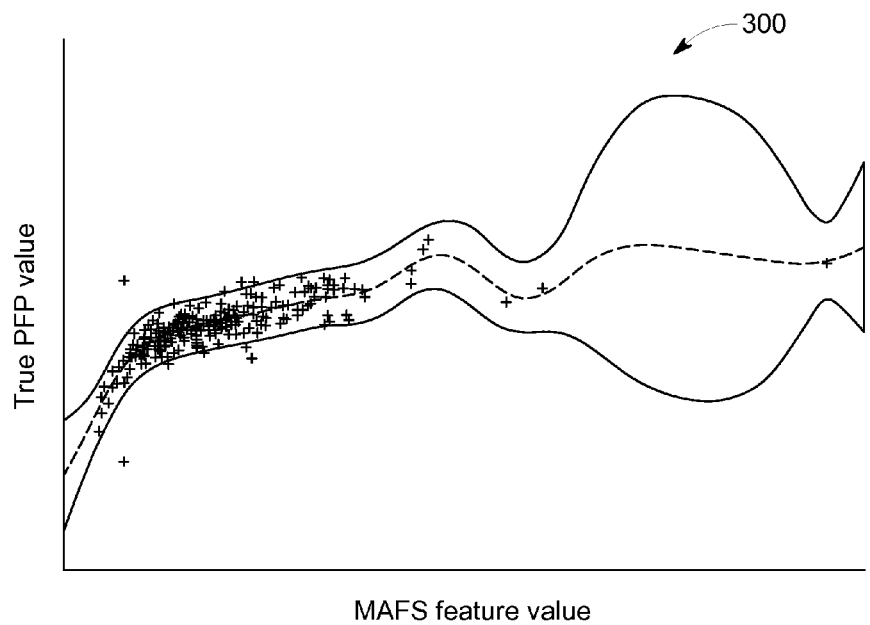
FIG. 13 is a sample plot of a GP model using a band pass filter with a range of 2.0-25.0 kHz in accordance with aspects of the present disclosure.

FIG. 13 shows a sample plot 300 of a GP model 302 using a band pass filter with a range of 2.0-25.0 kHz. The x-axis 264 represents the MAFS 114 for each engine cycle, as shown in plot 164. The y-axis 266 represents the true peak pressure for each engine cycle, as taken from the true PPVs 102 input to the system 25. Line 302 is the model created using a Gaussian Process (GP) ensemble. However, other regression models (e.g., linear models, kernel regression, random forest, etc.) may be used. The shaded region 304 represents the 95% confidence interval of the model 302. Using these models 262, 282, 292, 302, the system 25 may receive a raw knock signal 104, filter the signal 104 based on the PFBs 118, identify the MAFS features 114 for each cycle, and then estimate the PPVs in the engine 10.

Figure 14A:
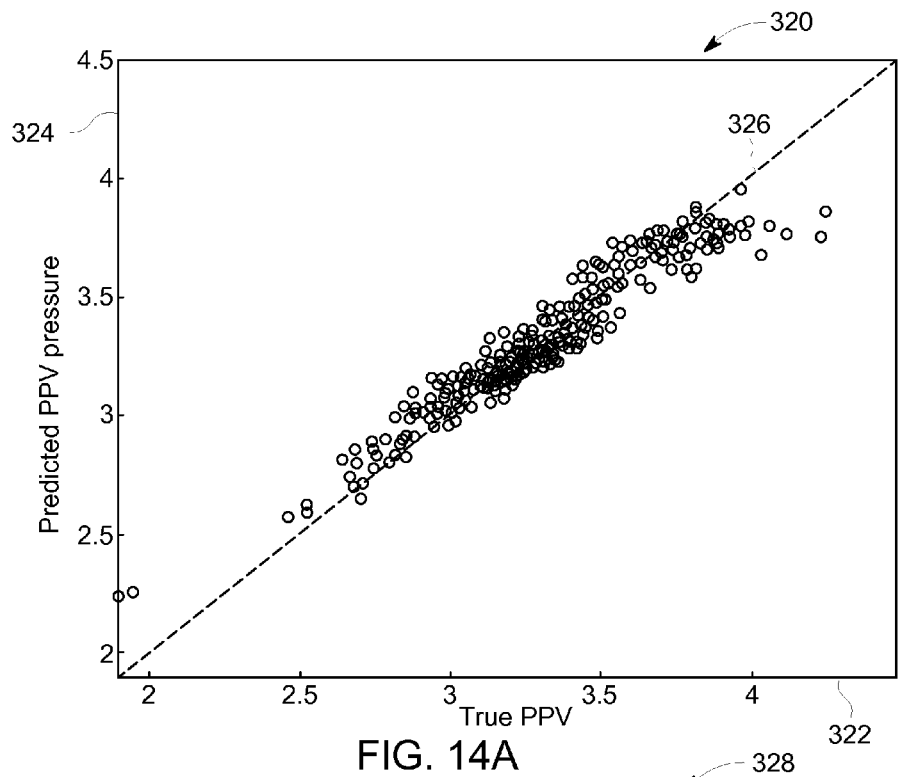
FIG. 14A is a scatter plot showing how the predicted PPVs compared to the true PPVs for a CFR-RON engine in accordance with aspects of the present disclosure.
Figure 14B:
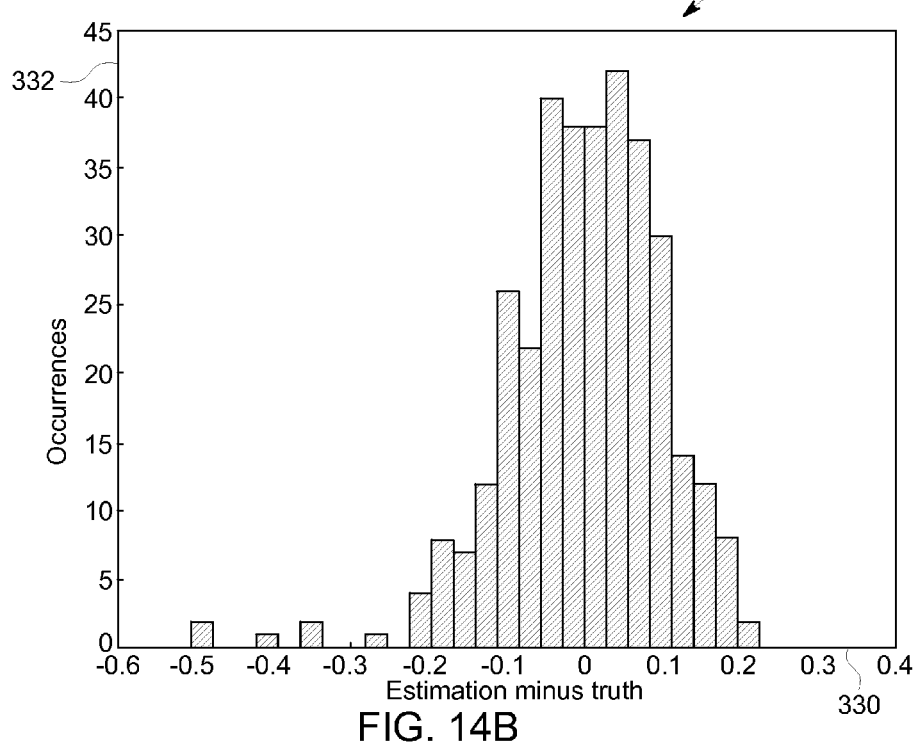
FIG. 14B is a histogram of the predicted PPVs minus the true PPVs for a CFR-RON engine in accordance with aspects of the present disclosure.

FIGS. 14A and 14B show the results of testing a model 126 generated by one embodiment of the system 25 using data from a CFR-RON engine. FIG. 14A is a scatter plot 320 showing how the predicted PPVs 130 compared to the true PPVs 102 for a CFR-RON engine. The x-axis 322 represents the true PPV 102 for each engine cycle. The y-axis 324 represents the predicted PPV 130 for each engine cycle. Line 326 is the line at which the predicted PPVs match the true PPVs. In this example, 350 engine cycles were used for training and 350 engine cycles were used for testing. With the sample data set used, there was a correlation of 95.9% between the PPVs 130 predicted by the model 126 and the true PPVs 102. FIG. 14B is a histogram 328 of the predicted PPVs 130 minus the true PPVs 102. The x-axis 330 represents the predicted PPV 130 minus the true PPV 102 for each engine 10 cycle. The y-axis 332 represents the number of occurrences for each difference value. As can be seen in FIG. 14B, the predicted PPV 130 minus true PPV 102 values are tightly clustered around zero, showing the accuracy of the model 126.

Figure 15A:
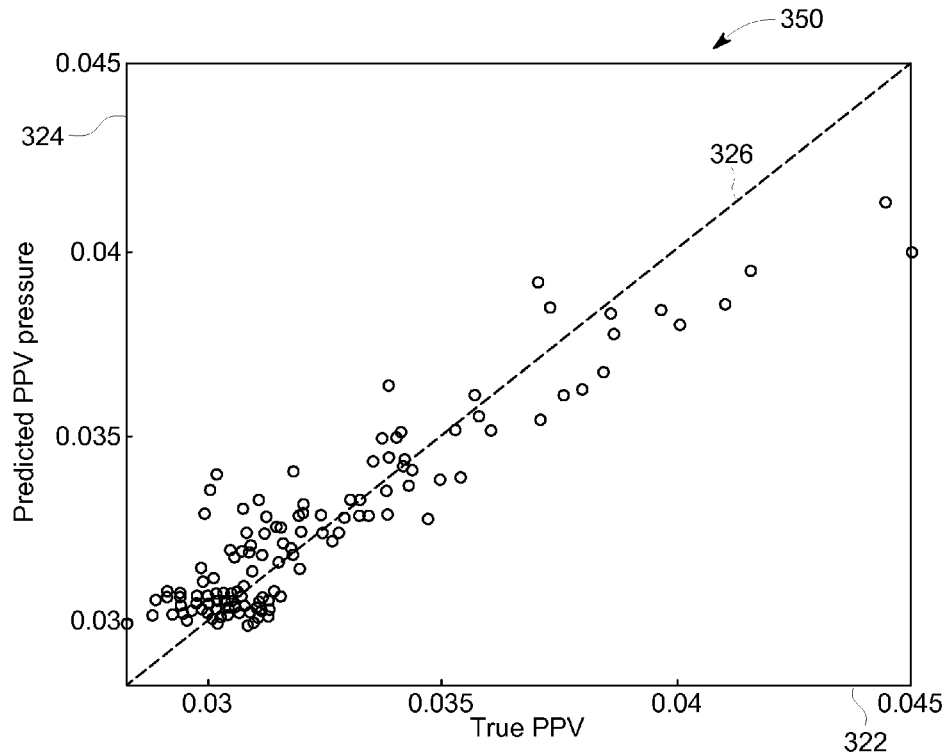
FIG. 15A is a scatter plot showing how the predicted PPVs compare to the true PPVs for a VHP L5794 engine in accordance with aspects of the present disclosure.
Figure 15B:
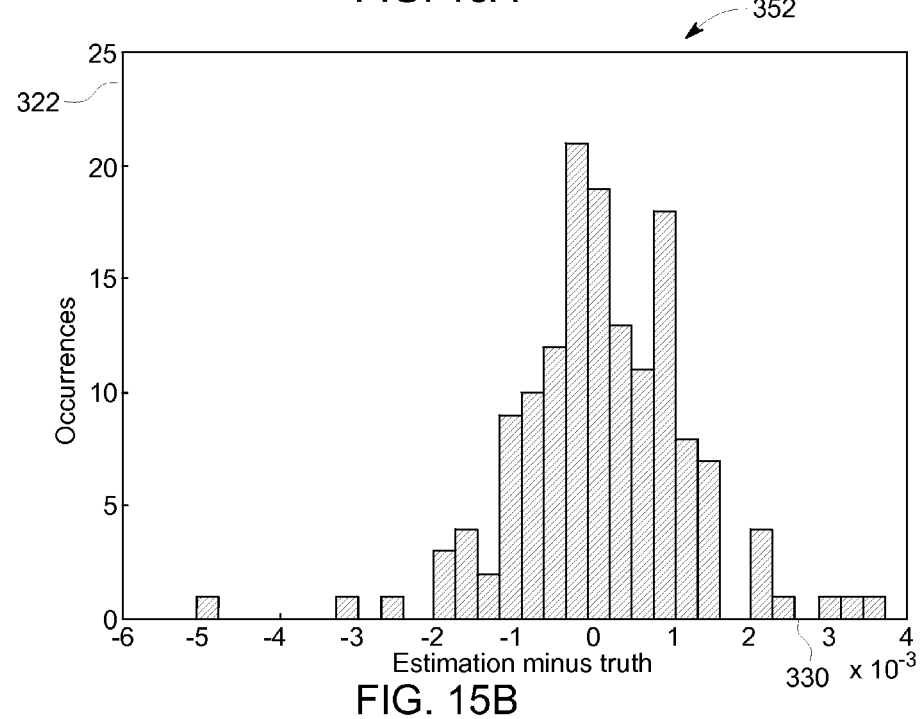
FIG. 15B is a histogram of the predicted PPVs minus the true PPVs for a VHP L5794 engine in accordance with aspects of the present disclosure.

FIGS. 15A and 15B show the results of testing a model 126 generated by one embodiment of the system 25 using data from a VHP L5794 engine. FIG. 15A is a scatter plot 350 showing how the predicted PPVs 130 compared to the true PPVs 102 for a VHP L5794 engine. The x-axis 322 represents the true PPV 102 for each engine cycle. The y-axis 324 represents the predicted PPV 130 for each engine cycle. Line 326 is the line at which the predicted PPVs match the true PPVs. In this example, 150 engine cycles were used for training and 150 engine cycles were used for testing. With the sample data set used, there was a correlation of 92.7% between the PPVs 130 predicted by the model 126 and the true PPVs 102. FIG. 15B is a histogram 352 of the predicted PPVs 130 minus the true PPVs 102. The x-axis 330 represents the predicted PPV 130 minus the true PPV 102 for each engine 10 cycle. The y-axis 332 represents the number of occurrences for each difference value. As can be seen in FIG. 15B, the predicted PPV 130 minus true PPV 102 values are tightly clustered around zero, showing the accuracy of the model 126.

It should be understood that FIGS. 10-13 and 14A-15B are merely examples that show how the disclosed techniques may be applied in specific circumstances. It should be understood that these figures and the corresponding discussion are merely examples and that the disclosed techniques may be applied to different engines used in different applications. When the disclosed techniques are applied to other engines and/or applications, plots 320, 350 and histograms 328, 352 created may differ from those shown in FIGS. 10-13 and 14A-15B. Accordingly, FIGS. 10-13 and 14A-15B and the corresponding discussion are not intended to limit that claims.

Technical effects of the invention include utilizing machine learning to estimate peak pressure values in a cylinder based on a knock signal from a knock sensor located outside of the cylinder. Because knock sensors are less expensive and more durable than in-cylinder pressure sensors typically used, use of the disclosed techniques may reduce the cost of operating an engine and reduce the number of times an engine is taken off-line.

This written description uses examples to disclose the claimed subject matter, including the best mode, and also to enable any person skilled in the art to practice the claimed subject matter, including making and using any devices or systems and performing any incorporated methods. The patentable scope of the claimed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   at least one sensor for sensing at least one of vibration, pressure, acceleration, deflection, or movement within a reciprocating engine; and
   a controller configured to:
   receive a raw signal from the at least one sensor;
   derive a filtered signal using predictive frequency bands by applying a filter;
   derive an absolute filtered signal from the filtered signal;
   identify a maximum of the absolute filtered signal for each engine cycle;
   predict a peak pressure value of each of one or more engine cycles using the identified maximums of the absolute filtered signal and a predictive model; and
   adjust operation of the reciprocating engine based on the predicted peak pressure values, wherein the at least one sensor is disposed outside of a cylinder in which the peak pressure occurs.

2. The system of claim 1, wherein the controller is configured to adjust operation of the reciprocating engine by adjusting one or more of an engine timing map of the reciprocating engine, a compression ratio of the reciprocating engine, an oxidant/fuel ratio of the reciprocating engine, a flow of exhaust recirculation gas of the reciprocating engine, or a position of an intake or exhaust valve of the reciprocating engine in response to the predicted peak pressure values.

3. The system of claim 1, wherein the filter comprises a low pass or a band pass filter.

4. The system of claim 1, wherein the filter has a range of 0-1400 Hz.

5. The system of claim 1, wherein the predictive model is based on a Gaussian Process ensemble.

6. The system of claim 1, wherein the at least one sensor comprises a piezoelectric sensor configured to sense vibrations and/or acoustics in a cylinder of the reciprocating engine.

7. The system of claim 1, wherein the predictive model is a linear model, a kernel regression model, a random forest model, or a combination thereof.

8. The system of claim 1, wherein the predictive model is trained to predict the peak firing pressure for a particular reciprocating engine.

9. The system of claim 1, wherein the sensor comprises a knock sensor.

10. A method for training a controller to estimate a peak firing pressure of a cylinder in a reciprocating engine, comprising:
    receiving a raw signal from at least one exterior sensor, wherein the raw signal comprises data corresponding to a peak firing pressure event;
    receiving a true pressure signal from a pressure sensor corresponding to the true peak firing pressure;
    deriving a filtered signal by applying a low pass or a band pass filter to the raw signal;
    deriving an absolute filtered signal from the filtered signal;
    identifying a maximum of the absolute filtered signal for each engine cycle;
    identifying the true peak pressure value for each engine cycle from the true pressure signal;
    mapping the maximums of the absolute filtered signal to the true peak pressure values;
    deriving predictive frequency bands for the peak firing pressure; and
    executing an algorithm to generate a predictive model using the maximums of the absolute filtered signal and the true pressure signal, wherein the predictive model is configured to estimate the peak firing pressure of the cylinder in the reciprocating engine during ordinary engine operation.

11. The method of claim 10, wherein the exterior sensor comprises a knock sensor.

12. The method of claim 10, wherein deriving predictive frequency bands comprises combining one or more sets of adjacent frequency bands until combining a pair of adjacent frequency bands does not improve predictiveness of the resulting predictive frequency bands.

13. The method of claim 10, wherein the pressure sensor is an in-cylinder pressure sensor.

14. The method of claim 10, wherein, the predictive model is a linear model, a kernel regression model, a random forest model, or a combination thereof.

15. The method of claim 10, wherein the method is repeated until the predictive model estimates the peak firing pressure within 95% of the true peak firing pressure.

16. The method of claim 10, wherein the reciprocating engine is a Waukesha VHP engine, a CFR-RON engine.

17. The method of claim 10, wherein the exterior sensor is disposed outside of the cylinder.

18. A system, comprising:
    a reciprocating engine controller configured to:
    receive a raw signal from at least one sensor coupled to a reciprocating engine;
    derive a filtered signal using predictive frequency bands by applying a low pass or band pass filter;
    derive an absolute filtered signal from the filtered signal;
    identify a maximum of the absolute filtered signal (MAFS) of each engine cycle;
    predict a peak firing pressure of each engine cycle using the identified MAFS and a predictive model; and
    output a control action for at least the reciprocating engine based on the predicted peak firing pressure, wherein the at least one sensor is disposed outside a cylinder.

19. The system of claim 18, wherein the control action comprises adjusting operation of the reciprocating engine by adjusting one or more of an engine timing map of the reciprocating engine, a compression ratio, an oxidant/fuel ratio of the reciprocating engine, a flow of exhaust recirculation gas of the reciprocating engine, a position of an intake or exhaust valve of the reciprocating engine, or another operating parameter of the reciprocating engine in response to the predicted peak firing pressure.

20. The system of claim 18, wherein the predictive model is trained to predict the peak firing pressure for a particular reciprocating engine.

* * * * *